United States Patent
Miller et al.

(10) Patent No.: US 7,093,258 B1
(45) Date of Patent: Aug. 15, 2006

(54) METHOD AND SYSTEM FOR MANAGING DISTRIBUTION OF COMPUTER-EXECUTABLE PROGRAM THREADS BETWEEN CENTRAL PROCESSING UNITS IN A MULTI-CENTRAL PROCESSING UNIT COMPUTER SYSTEM

(75) Inventors: Matthew Miller, Rancho Santa Margarita, CA (US); Robert L. Walker, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 690 days.

(21) Appl. No.: 10/209,454

(22) Filed: Jul. 30, 2002

(51) Int. Cl.
*G06F 9/46* (2006.01)
(52) U.S. Cl. ..................................... 718/105
(58) Field of Classification Search ........... 718/1, 718/100–108
See application file for complete search history.

(56) References Cited

U.S. PATENT DOCUMENTS

| | | | |
|---|---|---|---|
| 5,201,049 A * | 4/1993 | Shorter ........................... | 718/1 |
| 5,692,192 A * | 11/1997 | Sudo ........................... | 718/105 |
| 5,692,193 A * | 11/1997 | Jagannathan et al. ........ | 718/106 |
| 6,105,053 A * | 8/2000 | Kimmel et al. .............. | 718/105 |
| 6,289,369 B1 * | 9/2001 | Sundaresan .................. | 718/103 |
| 6,477,561 B1 * | 11/2002 | Robsman ..................... | 718/105 |
| 6,658,449 B1 * | 12/2003 | Brenner et al. .............. | 718/105 |
| 6,735,613 B1 * | 5/2004 | Jean-Dominique et al. . | 718/104 |
| 6,735,769 B1 * | 5/2004 | Brenner et al. .............. | 718/105 |
| 2003/0235194 A1 * | 12/2003 | Morrison .................... | 370/389 |
| 2005/0102677 A1 * | 5/2005 | Gootherts ................... | 718/105 |

OTHER PUBLICATIONS

Jaworski, Jamie. "Java Developer's Guide". Sams Publishing. 1996, pp. 5-10.*
Zhuang, Y.C. et al. "A Group-Based Load Balance Scheme for Software Distributed Shared Memory Systems." IEEE. May 2001.*
Zhou, Songnian et al. "Processor Pool-Based Scheduling for Large-Scale NUMA Multiprocessors." ACM. 1991.*
Lee, Shu-Ling et al. "A Cost-Effective Scheduling with Load Balancing for Multiprocessor Systems." IEEE. May 2000.*
Van Nieuwpoort, Rob V. et al. "Efficient Load Balancing for Wide-Area Divide-and-Conquer Applications." ACM. Jun. 2001.*
Patil, Milind. "Distributed Scheduling in SOMBRERO, A Single Address Space Distributed Operating System." Arizona State University. Dec. 1999.*

* cited by examiner

*Primary Examiner*—Lewis A. Bullock, Jr.
(74) *Attorney, Agent, or Firm*—Phong-Quan Hoang; Mark T. Starr; Lisa A. Rode

(57) ABSTRACT

A method and a system is disclosed for managing distribution of computer-executable program threads between a plurality of central processing units (CPUs) administered by an operating system in a multi-CPU computer system having a plurality of memory caches shared amongst the CPUs. The method includes assigning the CPUs to a plurality of CPU-groups of a predetermined group-size, selecting a CPU-group form the CPU-groups, setting a predetermined threshold for the selected CPU-group, and affinitizing a program thread to the selected CPU-group based on the predetermined threshold wherein the operating system distributes the program threads among the CPU-groups based on the affinitizing. In this way, the memory access time delays associated with the transfer of data amongst the CPU-groups can be advantageously reduced while the ability to more effectively utilize the total number of available CPUs in the processing of the program threads is advantageously increased.

28 Claims, 5 Drawing Sheets

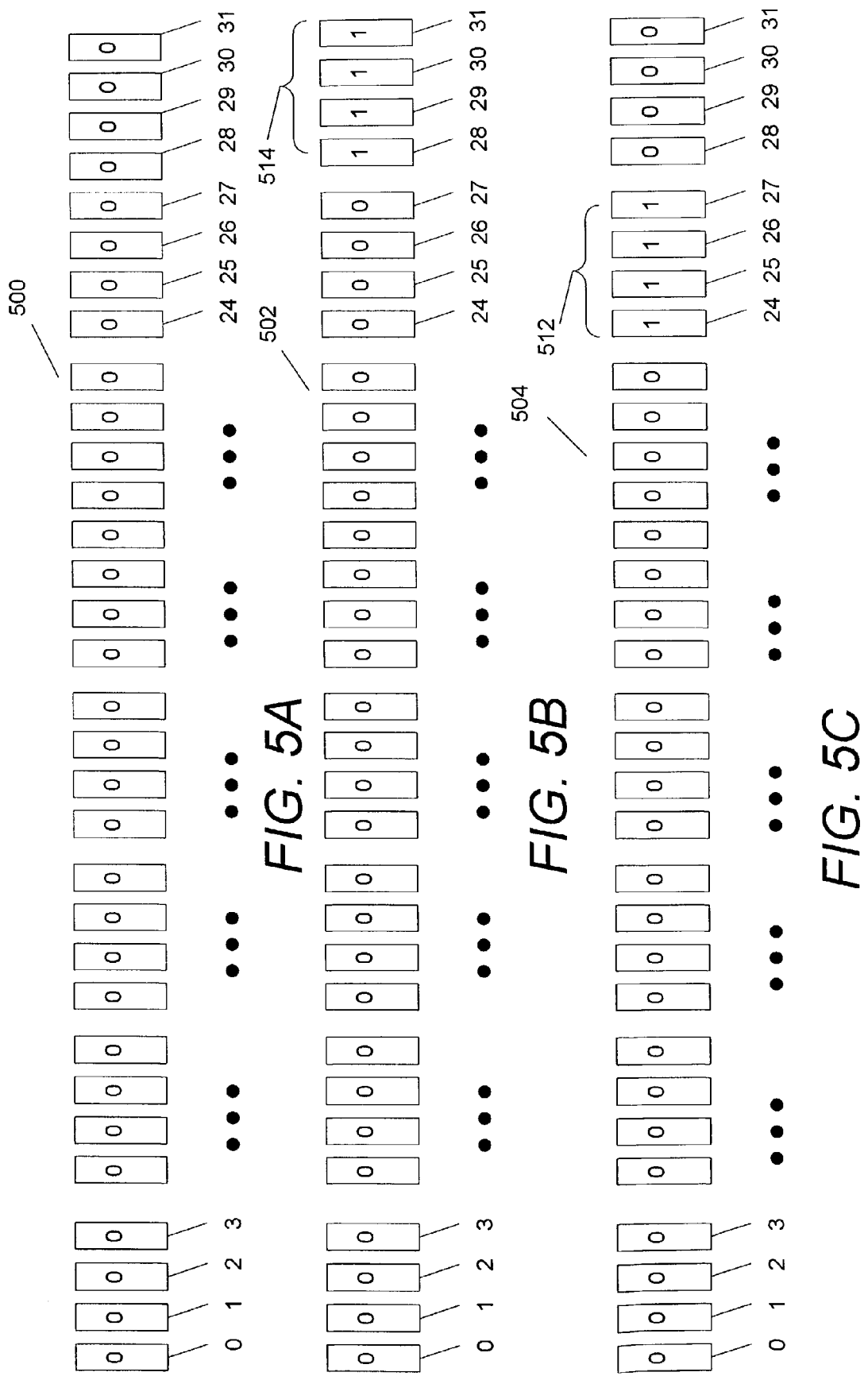

METHOD AND SYSTEM FOR MANAGING DISTRIBUTION OF COMPUTER-EXECUTABLE PROGRAM THREADS BETWEEN CENTRAL PROCESSING UNITS IN A MULTI-CENTRAL PROCESSING UNIT COMPUTER SYSTEM

FIELD OF THE INVENTON

This invention relates to multi-central processing units computer systems. More particularly, the present invention is directed to systems and methods for managing distribution of computer-executable program threads between central processing units (CPU) in a multi-CPU computer system having memory caches shared amongst the central processing units.

BACKGROUND OF THE INVENTON

Computers and computer based systems are in widespread use today, ranging from desktop personal computers to global and sophisticated computer networked systems which provide the backbone for today's World Wide Web. As a result, computers form an integral part of today's modern society.

Computers have been developed in a wide variety of electronic manufacturing and system architecture configurations, depending upon the intended use. At the core of each computer is a central processing unit (CPU) that performs the processing of program data and instructions necessary for the execution of a desired task. A CPU communicates with memory units comprised of random access memory (RAM) in main memory or cache memories during the execution of a desired task, called a "program" by practitioners of the art. Cache memories typically provide each CPU (or, less commonly, groups of CPUs) with a higher-speed copy of selected portions of the data in main memory. The memory units are used to store and retrieve a program's data and instructions during its execution. Generally, execution of most programs requires millions of memory accesses between a CPU and the memory units. The speed with which a memory unit can provide access to the data for a CPU can therefore greatly affect the overall performance of a computer. As the processing speed of the CPUs steadily increases, the need for faster delivery of data to a CPU from its memory units becomes increasingly important. Consequently, modern CPU architectures typically implement a hierarchy of caches starting with a very small and extremely fast first-level cache, and adding n-level caches that are progressively slower, but able to hold more program data and instructions.

Currently, methods for reducing the delay time associated with accessing data in memory units are based on a combination of memory access speed and proximity of each of the memory units with respect to the CPU. Cache (faster) memory units, can be placed closer to the CPU than main (slower) memory because of their smaller size and because typically only some, and not all, of the CPUs in the system need to access a single cache. In fact, caches are frequently placed inside the CPU unit to minimize the distance between the CPU and the cache. Two factors necessitate access to main memory: First cache memory can generally store less data than main memory and therefore it cannot accommodate all the program data and instructions required for the execution of a typical task. When there is not enough available memory space in cache memory, some of the program data and instructions contained in cache need to be relocated (or "evicted") to make available memory space for accommodating of new program data and instructions. Second, because a cache memory may not be accessible to all the CPUs in a multiple CPU system, any portions of its data that a particular CPU has modified need to be written back to main memory before they can be accessed by any other of the CPUs which do not share the same cache. Minimizing these two factors can result in substantial improvements in the overall computer performance.

To minimize the amount of cache eviction and to therefore maximize the effectiveness of cache memory, various well known techniques are used to estimate the program data and instructions most frequently accessed by a CPU in a given time interval, so that these data can be retained on the faster cache units. The general underlying principle of these techniques is that computer programs tend to access small portions of their data and instructions, which fit in the cache, during a given time interval. The first time a program accesses its data and instruction, the data and instructions are loaded into the cache and can be accessed rapidly thereafter. When a CPU proceeds to the execution of another subprogram, the pertinent new program data and instructions are also loaded into the cache from main memory for faster access. In this way, a CPU needs to access data in main memory only once in any small interval of time. When the cache becomes full, special hardware evicts (i.e. overwrites) the least-recently used instructions and data in the cache. Thus, the longer the time since the last access to a given portion memory, the less likely it is that the data will later be found in the cache.

Modern computer systems utilize CPU "time-slicing" techniques to simulate concurrent processing of multiple tasks, such as those by different users. Time slicing techniques execute a portion of a first task in a CPU for fraction of a second, before interrupting the CPU and instructing it to execute a second task. This process continues from one task to the next until the first task once again gets a turn to execute. Each subsequent task overwrites some of the first task's data and instructions in the cache, so that when the first task returns for execution, little or none of its program data and instructions may still be in the cache, and must therefore be "reloaded" into the cache from the relatively slower main memory.

As described above, because a cache memory may not be accessible to all the CPUs in a multiple CPU system, any portions of its data that a particular CPU has modified need to be written back to main memory before they can be accessed by any other of the CPUs which do not share the same cache. This factor becomes particularly evident on multiple CPU computer systems. In such computer systems, the operating system makes multiple CPUs available for the execution of tasks, which are typically divided amongst a number of CPUs for faster overall processing. One such multi-CPU environment is the Symmetrical Multi-Processor environment (SMP) in which multiple CPUs share a single main memory. In SMP systems when two or more CPUs need to access the contents of the same portion of main memory, they must take turns doing so, thus reducing the effectiveness of SMP for faster processing. Another multi-CPU environment is a NuMA™ environment in which each of several groups of CPUs has direct access to a predetermined subset of main memory. In a NuMA™ environment, CPUs in one group do not have direct access to memory units of another Group of CPUs, as in a SMP. Consequently, while this approach reduces competition among CPUs for a main memory location, it limits the number of CPUs that can work efficiently on a single task.

In a third approach, known as Cellular Multi-Processor (CMP) architecture, all CPUs share a single main memory (as in an SMP environment), but take advantage of special memory caches, known as third-level caches (TLC), which are shared amongst a group (called a "subpod") of CPUs. The TLC provides a large cache that can store much more program data and instructions. Because TLCs are shared among a group CPUs, such as a group of four CPUs, other CPUs in the same group can share data in the cache, resulting in more efficient use of the cache.

As with any cache, the performance improvements CMP gains from the use of TLC depends on program data and instructions staying in cache as long as possible. In a multiple-CPU system, a task often has an opportunity to run on a different CPU instead of waiting for the CPU on which it was last executed to become available. The benefits of switching to another CPU, however, can be detrimentally and often substantially reduced by the added delay associated with the reloading all of the task's program data and instructions into a different cache. For this reason, a system's performance may improve if tasks are discouraged from frequently switching CPUs. Likewise, in a CMP environment, system performance may improve if tasks are discouraged from switching from the CPUs of one Group of CPUs (such as a subpod) to the CPUs of another group of CPUs. This is because in a CMP system, all the CPUs in a Group of CPUs share a common TLC, and in the event the task switched to another CPU in the same Group of CPUs the task's data and instructions do not need to be reloaded from one TLC to another TLC.

Another benefit of restricting task switching between subpods in a CMP environment becomes most evident whenever a task splits itself into two or more concurrent sub-tasks called program threads, or, simply, threads. Program threads are sub-tasks that can be performed concurrently with only occasional need to communicate their results to one another. When threads do need to communicate, they often do so through a pre-designated memory location. If the threads that share such a pre-designated memory location are allowed to execute on CPUs in different subpods, then every access to that memory location must be carefully coordinated because one CPU may have altered the contents of the memory in its own TLC, and such a change would not be visible to the other thread on the other TLC without such coordination. Such coordination among TLCs, however, is time-consuming, and during which time some CPUs may sit idle while waiting for the TLCs to determine which CPU will be allowed to modify the data.

One existing approach to the foregoing problem is to use task affinitization, wherein a task (and all its program threads) is "affinitized" to a Group of CPUs (in this case, a subpod). In other words, a task affinitized to a Group of CPUs is executed only within that Group of CPUs. While this approach may reduce the time delays associated with the transfer of data amongst the TLC of different Group of CPUs, it restricts the execution of a task or tasks to a particular Group of CPUs (which is necessarily less than the total number of available CPUs in the system) and therefore compromises the benefits of having multiple CPUs.

An ongoing need thus exists in a CMP system to minimize the sharing of data between program threads executing on CPUs in different Group of CPUs, and to increase the number of available CPUs available for executing a given task's program threads.

SUMMARY OF THE INVENTION

It is an object of the present invention to provide a method for managing distribution of program threads between CPUs in a multi-CPU computer system wherein caches are shared between two or more CPUs.

An advantage of the present invention is the ability to minimize the sharing of data between program threads executing on CPUs in different CPU-groups, and to increase the number of available CPUs available for executing a given task's program threads.

These and other objects, which will become apparent as the invention is described in detail below, are provided in the context of a multi-CPU computer system, wherein a method is disclosed for managing distribution of computer-executable program threads between a plurality of central processing units (CPUs) administered by an operating system in a multi-CPU computer system having a plurality of memory caches shared amongst the CPUs. The method includes assigning the CPUs to a plurality of CPU-groups of a predetermined group-size, selecting a CPU-group form the CPU-groups, setting a predetermined threshold for said selected CPU-group, and affinitizing a program thread to said selected CPU-group based on said predetermined threshold wherein said operating system distributes said program threads among said CPU-groups based on said affinitizing.

Still other objects, features and advantages of the present invention will become readily apparent to those skilled in the art from the following detailed description. This description is shown and described only as the exemplary embodiments of the invention. It shows, by way of illustration, the best method contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

The accompanying drawings, which are incorporated in and constitute a part of this specification, illustrate one or more embodiments of the invention and, together with the present description, serve to explain the principles of the invention.

In the drawings:

FIGS. 5A–C are schematic diagrams of exemplary affinity-mask that may be employed in the method of the present invention.

DETAILED DESCRIPTION OF THE INVENTION

Figure 1:
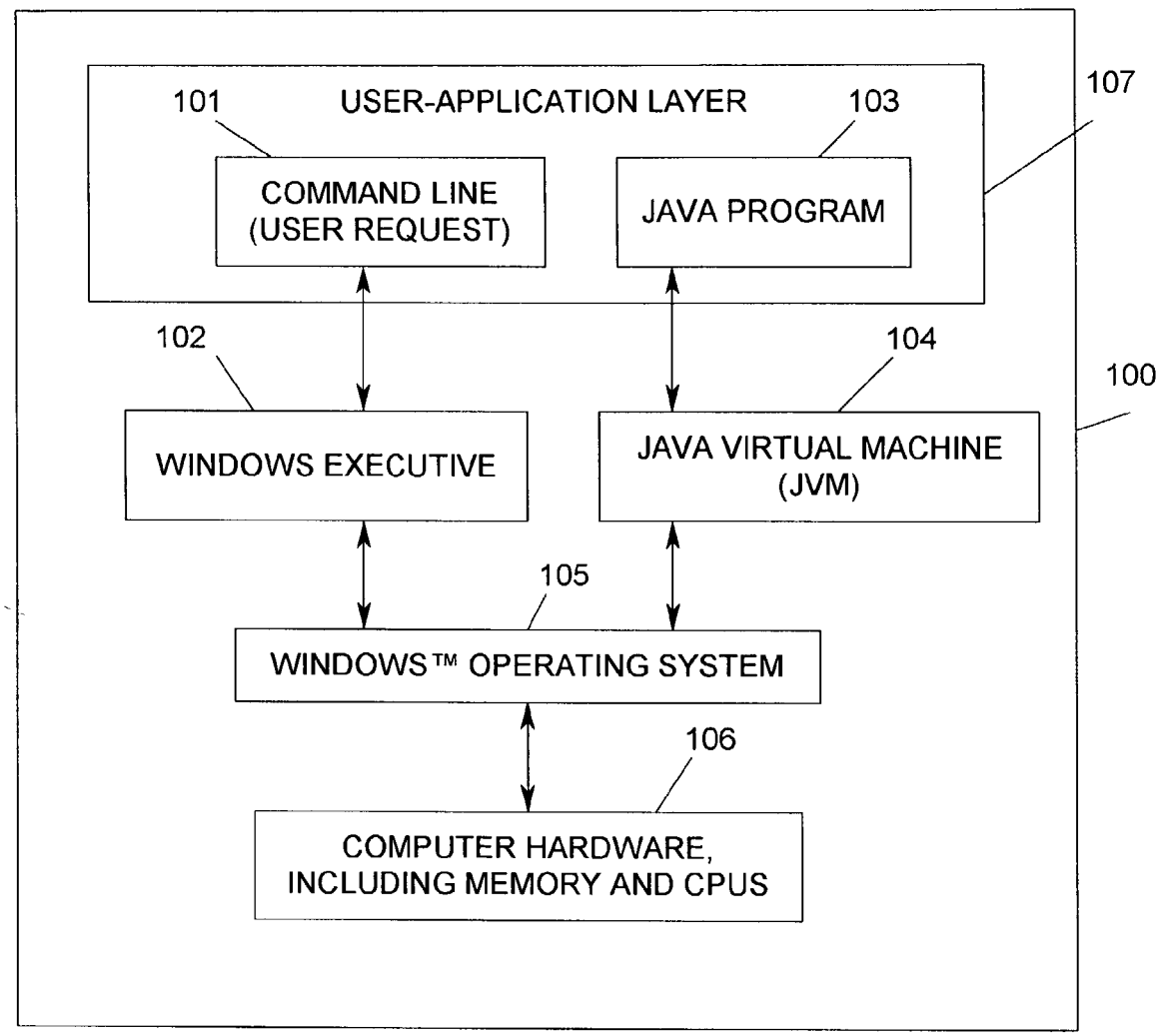
FIG. 1 is a block diagram of an exemplary system that may employ the method of the present invention.

Several embodiments of the present invention are described herein in the context of a multi-CPU computer system. Those of ordinary skill in the art will realize that the following description of the present invention is illustrative only and is not intended to be in any way limiting. Other embodiments of the invention will readily suggest themselves to such skilled persons having the benefit of this disclosure. Reference will now be made in detail to an implementation of the present invention as illustrated in the accompanying drawings. The same reference numbers will be used throughout the drawings and the following description to refer to the same or like parts.

In the interest of clarity, not all of the routine features of the implementations described herein are described. The present invention may be practiced in conjunction with various other practices in the context of multi-CPU computer systems having memory caches shared amongst its central processing units that are conventionally used in the art, and only so much of the commonly practiced operations are included herein as are necessary to provide an understanding of the present invention. It will of course be appreciated that in the development of any such actual implementation, numerous implementation-specific decisions must be made to achieve the developers' specific goals, such as compliance with system- and business-related constraints, and that these goals will vary from one implementation to another. Moreover, it will be appreciated that such a development effort might be complex and time-consuming, but would nevertheless be a routine undertaking of engineering for those of ordinary skill in the art having the benefit of this disclosure.

Before proceeding with a description of the system and method of the present invention, a summary of Terminology used herein is provided, which may be helpful in understanding the disclosed embodiment.

A Cellular Multi-processor (CMP) architecture provides a multi-CPU system in which CPUs are arranged in Groups of CPU with each Group of CPUs sharing a special memory cache unit known as Third-level caches (TLC). Every CPU has access to all of main memory. Furthermore, whenever any CPU accesses a main memory location, special hardware loads the data from that main memory location to that CPU's TLC so it can be accessed more quickly next time it is needed.

Third-level cache is a special cache memory external to the CPUs in a CMP environment. Each TLC is shared by a group of CPUs, such as a group of four CPUs. The TLC improves performance in a CMP computer by providing a cache that is significantly larger in memory space than the internal caches built into the CPUs, and by allowing CPUs to share cached program data and instructions with other CPUs in the same CPU group.

A Virtual Machine is a software program that behaves like a real computer and provides an interface between a user's program and the real computer, or platform, (that is, the operating system and associated hardware) that ultimately executes the user's program's instructions. The example of a virtual machine used throughout this disclosure is a Java™ Virtual Machine (JVM), which executes a Java Program provided by the user. Because Java programs are executed on the virtual machine, and not on the real computer, Java programs can run on any platform where a JVM is available.

Threads, as used throughout the disclosure, refer to program threads obtained from the Operating system by a Java™ Virtual Machine (JVM). Threads are typically small-sized sub-tasks that can be processes independently (and, therefore, concurrently). For example, if a program has tasks that can be processed independently, such as printing a copy of a document while the user continues to make updates, it can create a new thread to perform the independent task. On a multi-CPU system, such as CMP, many threads of the same program can be running at the same time because they can execute on multiple-CPUs.

Affinitization is a method by which specific threads to be executed in a multi-CPU system such as a CMP are restricted to a specific CPU or CPU-group selected from all available CPUs in the system. A thread that has been affinitized to a CPU or CPU-group is restricted to those CPUs. Stated otherwise, a thread that has been affinitized to a CPU-group will generally never execute on a CPU that is outside of that CPU-group.

Referring now to the drawings and FIG. 1 in particular, a top-level block diagram is shown of an exemplary system that may employ the method of the present invention. As shown, in a multi-processor computer system 100, Command Line 101 in user-application layer 107 contains a request to execute a user's Java Program 103, optionally with several program parameters. A Windows Executive 102, such as a command shell similar to the well known MS-DOS command shell used to input textual commands in Windows, issues the request to the operating system 105 and the operating system 105, in turn, creates a new JVM 104. The program parameters in the Command Line 101 optionally give settings of parameters used to control how the JVM 104 will request threads be affinitized by the operating system 105, when they are requested by the Java Program 103.

To better illustrate the present invention, an exemplary embodiment of the present invention is used throughout the specifications in the context of a Unisys Cellular Multi-Processor (CMP) computer system 100 (Unisys ES7000 CMP computers) in which the Command Line 101 is a request to a Windows™ Executive 102 which, in turn makes a request of the Operating System 105 to create a new process. This process will consist of Java Program 103 executed by a Java™ Virtual Machine (JVM) 104 which interfaces with a Windows™ Operating system 105 (in this case, Windows 2000 DataCenter™) which administers the operations of the Computer Hardware 106. The exemplary implementations described in this document may require that the developer build the Sun JVM from source code which can be obtained from Sun Microsystems. Sun Microsystems, Inc., has published a complete description of the JVM and its operation in a book entitled "The JAVA Virtual Machine Specification" (ISBN 0-201-63452-X). It should be noted that the present invention is not in any way limited to the foregoing exemplary products.

The overall operations of the system illustrated in FIG. 1 will now be discussed in greater detail in conjunction with FIG. 2 which illustrates a schematic diagram of an exemplary computer hardware 106 shown in FIG. 1. The exemplary embodiment shown in FIG. 2 contains 32 CPUs 200, although any number of CPUs may be employed. As shown, each CPU 200 is in communication with a third level cache (TLC) 212 unit via a communication medium 210 such as an internal data bus, that is shared with one or more other CPUs 200. A TLC 212 unit is a type of cache-memory that is not internal to the CPUs 200 themselves, but is located near a CPU 200 for performance reasons while allowing more than one CPU 200 to access a TLC 212 unit. The accessed TLC 212 unit provides performance improvements to the accessing CPU 200 because program data and instructions frequently used by the accessing CPU 200 are readily available in the accessed TLC 212 unit. Additionally, each TLC 212 unit is connected to a crossbar interconnect unit 214. The crossbar intraconnect unit 214 provides a communication link between two TLC 212 units, as well as indirect communication with main memory unit 224, comprised of a set of random access memory (RAM) units such as RAM units 216, 218, 220 and 222. The crossbar intraconnect unit 214 allows any of CPUs 200 that is processing a desired task to access data in the main memory unit 224, as well as other TLC 212 units. Generally, when a thread is to be executed, the operating system 105 determines the availability of the CPUs 200 and schedules the thread for execution on any available CPU 200. The first time a CPU 200 accesses the program data and instructions needed to perform the thread's task, they are loaded from main memory unit 224 into the TLC 212. Subsequently, the program data and instructions are more quickly available to the accessing CPU 200 because they now reside in the closer TLC 212 unit, thus resulting in better performance of the CPU 200.

Frequently, a request for execution of a desired program results in the generation of a large number of threads so that at any given time, multiple threads are executed on each CPU 200. To execute multiple threads on a CPU 200, well-known "time-slicing" techniques are used by the Operating system 105 to control which thread gets the CPU 200, and when. In these techniques, a first thread is executed in a CPU 200 for a short time interval (usually a small fraction of a second), before the CPU 200 is switched to performing the same for a second thread. Once all the other threads waiting for the CPU 200 have had their time-slice, the CPU 200 will be switched back to executing the first thread. In a single-CPU system, the execution of the first task is suspended until its turn for another time-slice, resulting in slower performance as more threads are added. In a multi-CPU environment, the operating system 105 distributes the threads amongst a number of CPUs 200, so that more threads can execute without a performance penalty associated with waiting for the single CPU. In this way, a thread whose execution has been suspended by one CPU 200 may be assigned to another CPU 200 for earlier resumption of its execution, should the CPU 200 it was running on remain busy for longer than expected, or should another CPU 200 become available earlier than expected.

This movement of a thread between different CPUs 200 during its execution, however, is not without cost. Since the program data and instructions corresponding to a thread had been loaded into and present in the TLC 212 unit of the first CPU 200 for better performance, then assignment of that thread to a new CPU 200 that is connected to a different TLC 212 unit mandates the reloading of all the program data and instructions corresponding to that thread into the different TLC 212 unit. For example, if a thread was originally executing in a CPU 200 in CPU-group 240 of FIG. 2, and thereafter was assigned by the operating system 105 to execute on a CPU 200 in CPU-group 242, any data which that thread modified must be first written from the accessed TLC 212 unit in CPU-group 240 to main memory unit 224 so that the modifications to the data are not lost. Next, all the program data and instructions are loaded into the TLC 212 unit in CPU-group 242 as they are accessed from the main memory unit 224. Updating main memory and loading program data and instructions into a new TLC 212 unit is very time-consuming, and if not controlled, can quickly erode the benefits of using TLC 212 units in the CMP system.

Figure 3:
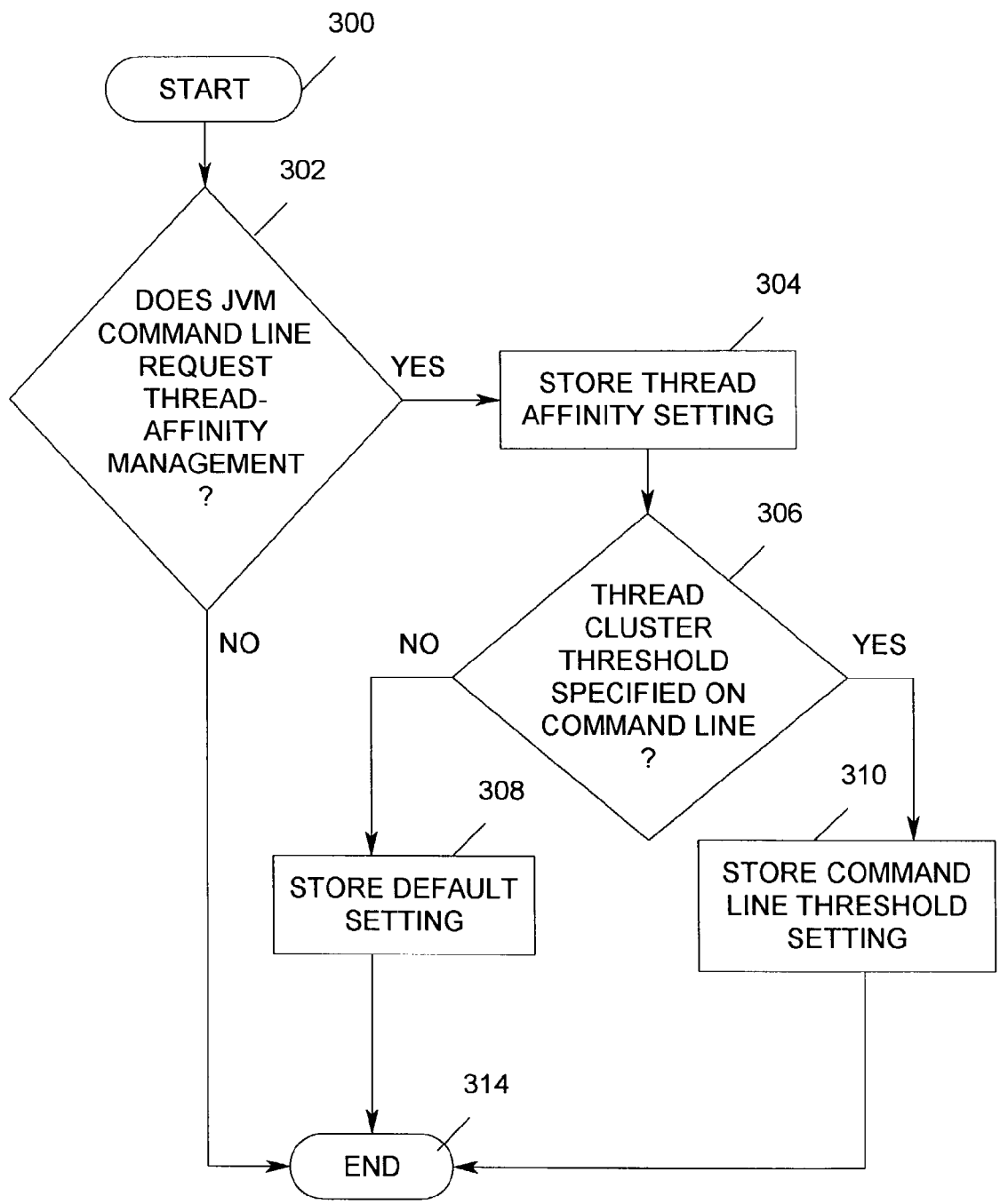
FIG. 3 is a flow chart illustrating a method used by the present invention to collect user-specified data at the beginning of a task.
Figure 4:
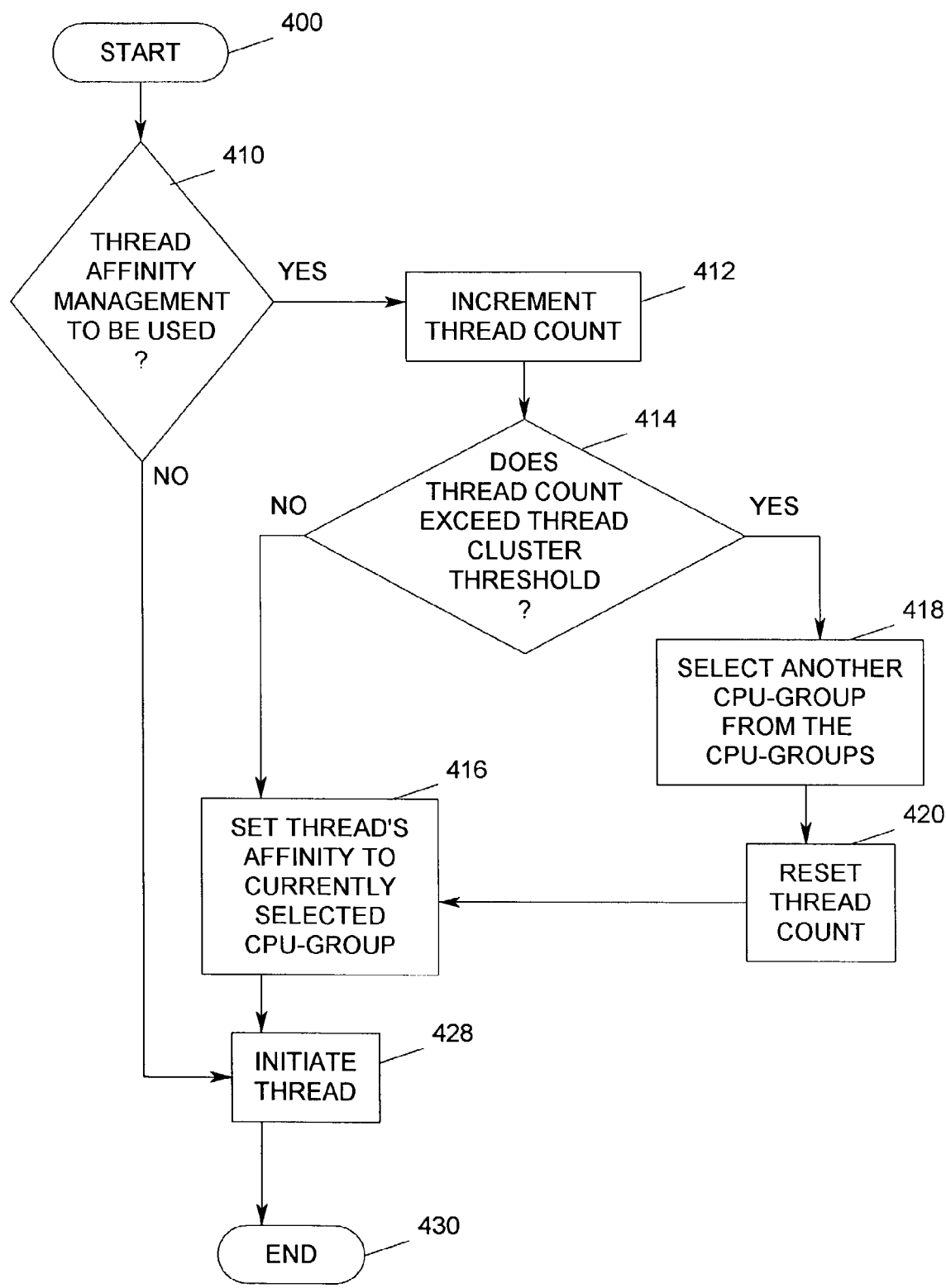
FIG. 4 is another flow chart illustrating a method of the present invention for managing the affinitization of program threads as they are created.

In the present invention as shown in conjunction with FIG. 3 and FIG. 4, a thread affinity management method is disclosed in which as the Java Program 103 requests new threads to perform its work, the JVM 104 obtains a thread from the operating system 105 and applies affinitization to the thread before finally making it accessible to the Java Program 103. When the Java Program 103 runs the thread, the operating system 105 will then assign the thread to one of the CPUs 200 for execution based on the affinitization included in each thread by JVM 104.

Figure 2:
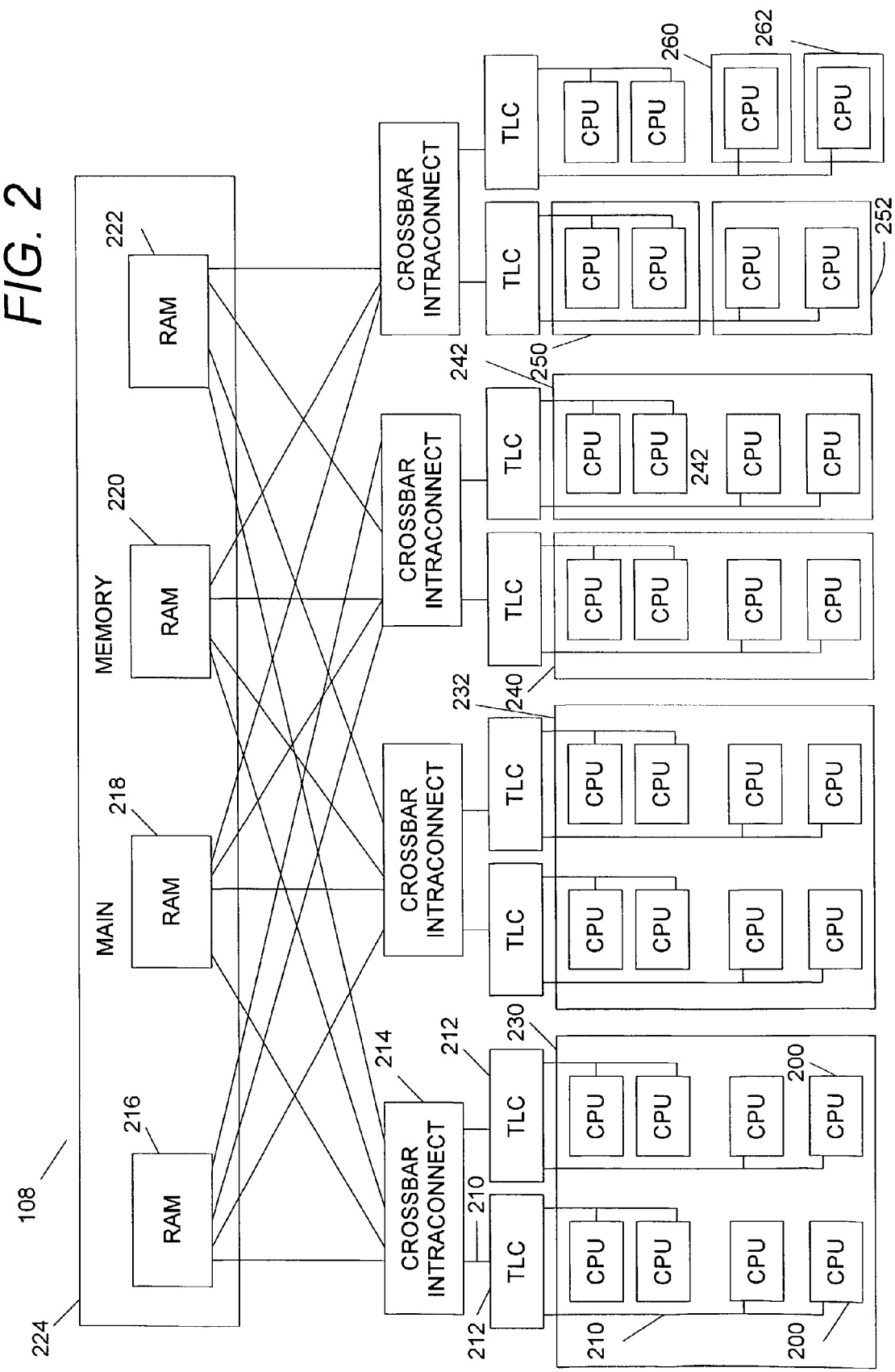
FIG. 2 is a schematic diagram of an exemplary system that may employ the method of the present invention.

FIG. 3 is a flow chart illustrating a method of the present invention for managing distribution of program threads between central processing units in a multi-CPU computer system such as that shown in FIG. 1 and FIG. 2. The process in FIG. 3 illustrates an initialization stage which occurs only once for each JVM process, before the Java Program 103 makes any requests for threads. During this initialization, the information included in a user request is interpreted and stored for later use (to be described in greater detail in conjunction with FIG. 4). As shown in FIG. 3, the flow begins in block 300, and proceeds to the decision block 302, where it is determined whether a user request for the processing of a task includes a request for use of the thread affinity management method of the present invention. The user request for use of the thread affinity management method of the present invention includes in part a logical assignment of each CPU 200 to one of a collection of CPU-groups, such as CPU-group 230, of a predetermined group-size. In an exemplary embodiment, the assignment of a CPU 200 to a particular CPU-group each is determined based on a predefined proximity of the CPU 200 to a TLC 212 unit. The group-size for each CPU-group is then determined at either one of: 1) crossbar interconnect unit 214 level, commonly referred to as a "pod", such as CPU-group 230 and 232 each having 8 CPUs 200; or 2) at TLC 212 unit level, commonly referred to as a "subpod", such as CPU-groups 240 and 242 each having 4 CPUs 200; or 3) at communication medium 210 level between each TLC unit 212 and CPUs 200, commonly referred to as a "bus", such as CPU-groups 250 and 252 each having 2 CPUs 200; or 4) at the individual CPU 200 level, referred to as simply "CPU", such CPU-groups 260 and 262 each having a single CPU 200.

If in decision block 302 it is determined that a user request includes a request for use of the Thread Affinity Management method of the present invention, then the flow proceeds to block 304 where the information on the settings of the logical assignment of the CPUs 200 to CPU-groups are stored for later use. In an exemplary embodiment, a user request for use of the Thread Affinity Management of the present invention is received in JVM 104 in the form of a JVM command-line having parameters containing user-inputted or system default instructions for the foregoing the assignment of the CPUs to CPU-groups, and for setting of a predetermined flag, such as a flag "A" in JVM 104, to store such assignment for use after the process in block 304 is complete.

Next, in the decision block 306 it is determined whether the user-request includes instructions for setting of a predetermined threshold "X" for the number of threads processed in each CPU-group of block 304. In an exemplary embodiment, a threshold is a numerical threshold whose significance will be described in greater detail in conjunction with FIG. 4 below. If in block 306 it is determined that a threshold value has been included in the request, then the flow proceeds to block 310 where the desired threshold value is stored for later use, with the flow proceeding to and ending in block 314. If in block 306 it is determined that a threshold value has not been included in the request, then the flow proceeds to block 308 where a system-default threshold value is stored for later use, with the flow proceeding to and ending in block 314. In an exemplary embodiment, instructions for setting of a predetermined threshold is received in JVM 104 in the form of a JVM command line having parameters containing the instructions for the setting of a predetermined threshold, and for setting of a predetermined flag, such as flag "X" in JVM 104 to store the settings of such assignment for use after the process in either of block 310 or 308 is complete.

Returning to decision block 302 in FIG. 3, if it is determined that the JVM command line does not include a request for use of the thread affinity management method of the present invention, then the command line is handled as it is without the use of the thread affinity management method of the present invention and the flow proceeds to end in block 314.

FIG. 4 is another flow chart illustrating the method of the present invention in conjunction with FIGS. 5A–C. As shown in FIG. 4, the flow begins at block 400 and proceeds to the decision block 410 for determining whether the thread affinity management method of the present invention was requested in FIG. 3. In an exemplary embodiment, the predetermined flag, flag "A", set in FIG. 3, is checked for in the determination block 410. If in decision block 410 it is determined that flag "A" was set (i.e., that affinitization of the CPUs to CPU-groups has been requested), the flow then proceeds to block 412 where an internal counter, which is initialized to a predetermined reset value such as zero, is incremented to indicate that a thread has been requested by the Java program 103.

Next, in decision block 414, the thread-count is compared with the predetermined threshold value set in FIG. 3 to determine whether the threshold has been reached. If the thread-count equals the threshold, then the threshold has been reached. If the threshold number has not been reached, then the flow proceeds to block 416 where the thread is affinitized to the currently selected CPU-group. In an exemplary embodiment, the thread is affinitized to the currently select CPU-group using an affinity mask applied to the thread and by calling the operating system 105. Next, the flow proceeds to block 428 where the threads are initiated based on the affinitization information included in the thread in the process illustrated in FIG. 4, which ends at block 430.

Returning to the decision block 414, if the thread-count exceeds the threshold then the flow proceeds to block 418 where another CPU-group is selected for affinitization of this and subsequent threads. Referring to FIG. 2, the new CPU-group can be any one of the other CPU-groups in the CMP including any of the previously visited CPU-groups. It should be noted that FIG. 2 shows groups of different sizes for illustrative reasons only and that, in the exemplary implementation all CPU-groups are of one group size for any execution of a JVM. Returning to block 420 in FIG. 4, following the selection of another CPU-group, the flow proceeds to block 420 where the thread count is reset to a predetermined reset value such as zero, so that future comparisons of thread count and threshold are valid. Finally, affinitization information is applied to the thread in block 416 as described above, and the flow then proceeds to block 428 where the threads are initiated based on that affinitization information. The flow proceeds to block 430, when the thread affinity management for this new thread ends.

Returning to decision block 410, if it is determined that the thread affinity management of the present invention was not requested in FIG. 3, then the flow proceeds to block 428 where the threads are initiated based on the prior art processes, and ending at block 430.

Once a thread has been generated by the operating system 105 at the request of the JVM 104, the Java Program 103 instructs the JVM 104 to run (i.e., execute) the thread, whereupon it is executed by the operating system 105 on the Computer Hardware 106 based on the affinitization setting as described in FIG. 4.

One advantage of the foregoing feature of the present invention is that the prior art only allowed affinitizing the entire JVM, and therefore the entire Java Program, to a single CPU-group. In the present invention, affinitizing groups of threads to CPU-groups allows the performance benefits of controlling thread movement from a CPU 200 to another CPU 200 without restricting the whole JVM 104 to a single CPU-group. System performance therefore advantageously improves because thread movement is minimized while all the CPUs 200 on the system remain available to the JVM 104 and to the Java Program 103.

FIGS. 5A–C are schematic diagrams of an exemplary affinity CPU mask that may be employed in the method of the present invention as described in blocks 416 and 418 of FIG. 4. FIG. 5A illustrates an exemplary format of an affinity CPU mask in the form of a bit mask 500 wherein each of the bits 0–31 represent the availability of one of the 32 CPUs 200 shown in FIG. 2. In the example shown in FIG. 5A, the mask is set to a value of 00000000 meaning no CPUs 200 are available for execution of a thread. FIG. 5B represents a bit-mask 502 of the format shown in FIG. 5A but with four sequential CPUs 200 (shown collectively as cluster 514), such as those in subpod CPU-group 240 in FIG. 2, available for the execution of a thread. By using mask 502 in block 420 of FIG. 4, a thread is affinitized to the four sequential CPUs 200 in block 416 of FIG. 4. Whenever the threshold is reached, another CPU-group is selected as in block 420 of FIG. 4, and another mask such as one shown in FIG. 5C can be used for block 420. By changing of the value of the mask 502 in FIG. 5B, a new mask, such as mask 504 shown in FIG. 5C, can be created. FIG. 5C represents a bit-mask 504 of the format shown in FIG. 5B but with a hexadecimal-represented value of 000000F0. As shown, this mask 504 value signifies that four sequential CPUs 200 (shown collectively as cluster 512), such as those in subpod CPU-group 242 in FIG. 2, are available for the execution of a thread. It should be noted that the number of CPUs 200 per cluster and positions of each cluster in relation to a previous cluster as shown in FIGS. 5B–C are exemplary only and affinity masks selecting any number of CPUs 200 with any ordering of clusters in relation to a previous cluster may equally be used and are anticipated to be within the scope of the present invention.

In an exemplary embodiment using a JVM 104, the assignment of CPUs 200 to CPU-groups and the setting of the predetermined threshold are both accomplished by use of a JVM CPU affinity mask for which the user specified the CPU-group sizes and the predetermined numerical threshold for the number of threads to be assigned to a CPU-group on the command line, as shown in FIG. 3. In an exemplary embodiment, the user may then execute a program repeatedly with different affinity CPU-mask settings for observing the overall performance of the multi-CPU computer system to determine optimal settings for the execution of a program.

It should be noted that the various features of the foregoing embodiments were discussed separately for clarity of description only and they can be incorporated in whole or in part into a single embodiment of the invention having all or some of these features. It should further be noted that the invention is not limited to a CMP architecture but can be used in conjunction with virtually any multi-CPU computer system in which a plurality of third-level memory caches is shared amongst groups of CPUs.

Although the invention has been described with reference to specific embodiments, this description is not meant to be construed in a limiting sense. Various modifications of the disclosed embodiments as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A method comprising:
   assigning a plurality of central processing units (CPUs) to a plurality of CPU-groups of a predetermined group-size, the CPUs being administered by an operating system in a multi-CPU computer system having a plurality of memory caches shared among said CPUs;
   selecting a CPU-group from said plurality of CPU-groups;
   setting a predetermined threshold of number of threads for said selected CPU-group; and
   affinitizing a program thread to said selected CPU-group based on said predetermined threshold wherein said operating system distributes program threads among said CPU-groups based on said affinitizing.

2. A method in accordance with claim 1, said affinitizing comprising:
   maintaining a thread-count of said program threads affinitized to said selected CPU-group;
   determining if said thread-count has reached said predetermined threshold; and
   affinitizing another one of said program threads to said selected CPU-group if said thread-count has not reached said predetermined threshold based on said determining.

3. A method in accordance with claim 2, wherein said thread-count has reached said predetermined threshold based on said determining, and wherein said affinitizing further comprises:
   selecting another of CPU-group from said CPU-groups;
   resetting said thread-count to a predetermined reset-value; and
   affinitizing another one of said program threads to said selected another CPU-group.

4. A method in accordance with claim 3, wherein said affinitizing is a dynamic affinitizing of said program threads as said program threads are requested.

5. A method in accordance with claim 4, wherein thread-count is a numerical thread-count, and wherein said maintaining said thread-count comprising:
   incrementing said thread-count by a predetermined increment each time another one of said program threads is requested.

6. A method in accordance with claim 4, wherein said affinitizing is performed by a predetermined affinity mask.

7. A method in accordance with claim 1, wherein said memory caches in said multi-CPU computer system communicate with each other and with said CPUs, wherein each said memory cache is at a predefined communication proximity to at least one of said CPUs, and wherein said assigning is based on said proximity of each of said CPUs to each said memory cache.

8. A method in accordance with claim 1, wherein said predetermined threshold is a numerical threshold set by at least one of a user-input and a system-default setting.

9. A method in accordance with claim 1, wherein said multi-CPU computer system is a cellular multi-processor (CMP) computer system.

10. A method in accordance with claim 1, wherein said managing is performed by a Java™ Virtual Machine (JVM).

11. A method in accordance with claim 10, wherein each said program thread is a Java™ thread.

12. A method in accordance with claim 11, wherein each said program thread is a Java™ Virtual Machine (JVM) thread.

13. A method in accordance with claim 12, wherein said operating system is a Windows™ operating system.

14. A method in accordance with claim 13, wherein said JVM is in communication with a user-application layer and wherein said application layer instructs said JVM via at least one JVM command for performing said managing.

15. A system comprising:
   an assignment subsystem to assign a plurality of central processing units (CPUs) to a plurality of CPU-groups of a predetermined group-size, the CPUs being administered by an operating system in a multi-CPU computer system having a plurality of memory caches shared among said CPUs;
   a selector subsystem to select a CPU-group from said plurality of CPU-groups;
   a setting subsystem to set a predetermined threshold of number of threads for said selected CPU-group; and
   an affinitization subsystem to affinitize a program thread to said selected CPU-group based on said predetermined threshold wherein said operating system distributes program threads among said CPU-groups based on said affinitizing.

16. A system in accordance with claim 15, said affinitization subsystem further comprising:
   a maintaining subsystem adapted to maintain a thread-count of said program threads affinitized to said selected CPU-group;
   a determining subsystem adapted to determine if said thread-count has reached said predetermined threshold wherein said affinitization subsystem is adapted to affinitize another one of said program threads to said selected CPU-group if said thread-count has not reached said predetermined threshold based on said determination.

17. A system in accordance with claim 16, wherein said selector subsystem is adapted to select another of CPU-group from said CPU-groups when said thread-count has reached said predetermined threshold based on said determination, and wherein said system further comprising:
   a reset subsystem adapted to reset said thread-count to a predetermined reset-value when said another selected CPU-group is selection, wherein said affinitization subsystem is adapted to affinitize another one of said program threads to said selected another CPU-group.

18. A system in accordance with claim 17, wherein said affinitization subsystem is adapted to dynamically affinitize said program threads as said program threads are requested.

19. A system in accordance with claim 18, wherein thread-count is a numerical thread-count, and wherein said maintaining subsystem is adapted to increment said thread-count by a predetermined increment each time another one of said program threads is requested.

20. A system in accordance with claim 18, wherein said affinitization subsystem is adapted to perform said affinitization based on a predetermined affinity mask.

21. A system in accordance with claim 15, wherein said memory caches in said multi-CPU computer system communicate with each other and with said CPUs, wherein each said memory cache is at a predefined communication proximity to at least one of said CPUs, and wherein said assigning is based on said proximity of each of said CPUs to each said memory cache.

22. A system in accordance with claim 15, wherein said predetermined threshold is a numerical threshold set by at least one of a user-input and a system-default setting.

23. A system in accordance with claim 15, wherein said multi-CPU computer system is a cellular multi-processor (CMP) computer system.

24. A system in accordance with claim 15, wherein said managing is performed by a Java™ Virtual Machine (JVM).

25. A system in accordance with claim 24, wherein each said program thread is a Java™ thread.

26. A system in accordance with claim 25, wherein each said program thread is a Java™ Virtual Machine (JVM) thread.

27. A system in accordance with claim 26, wherein said operating system is a Windows™ operating system.

28. A system in accordance with claim 27, wherein said JVM is in communication with a user-application layer and wherein said application layer instructs said JVM via at least one JVM command for performing said managing.

\* \* \* \* \*